Feb. 5, 1952 L. A. WOODSWORTH 2,584,521
EMERGENCY CONTROL FOR BRAKES
Filed June 7, 1951 2 SHEETS—SHEET 2
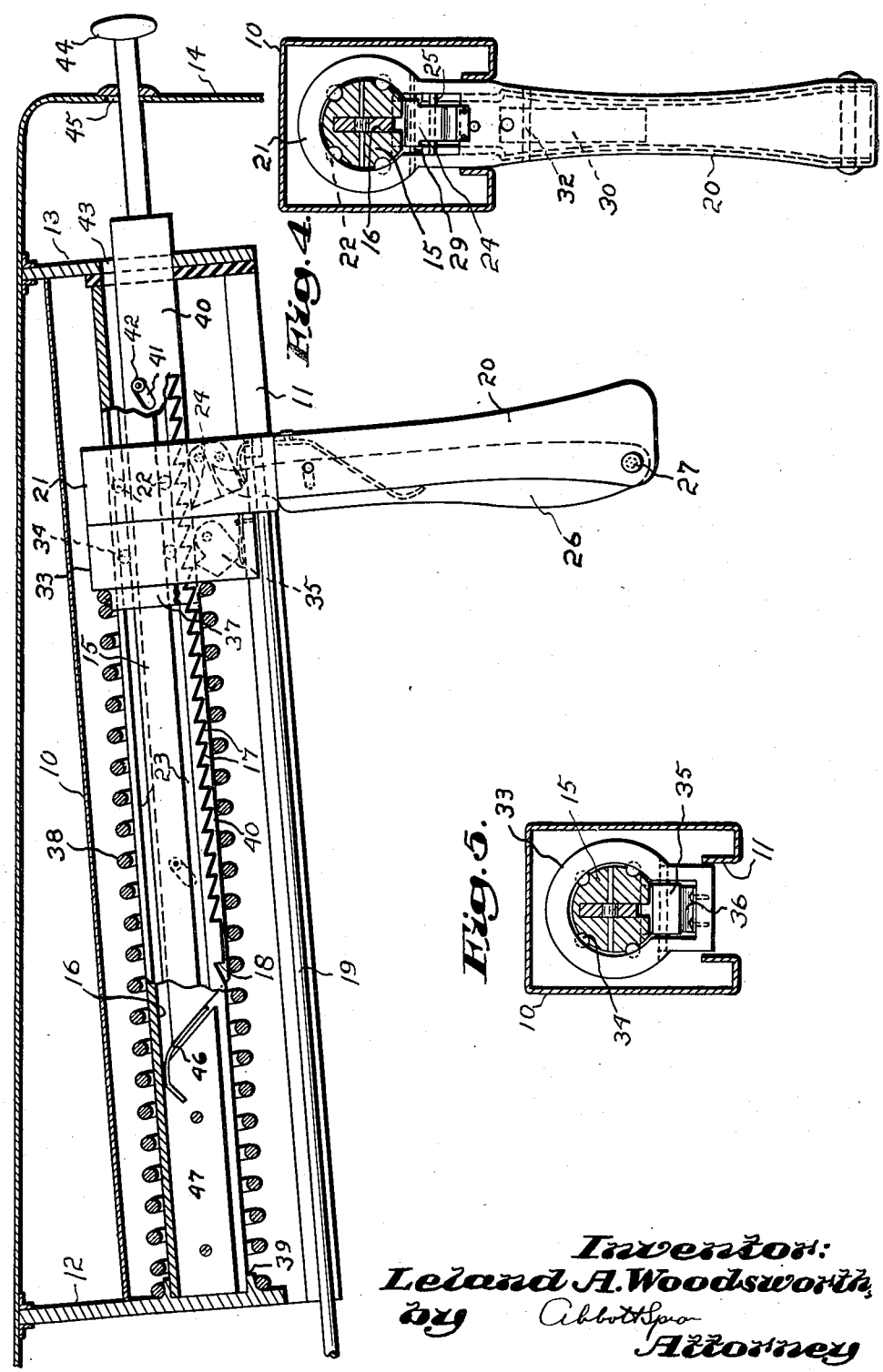
Inventor:
Leland A. Woodsworth,
by Abbott Spear
Attorney Patented Feb. 5, 1952

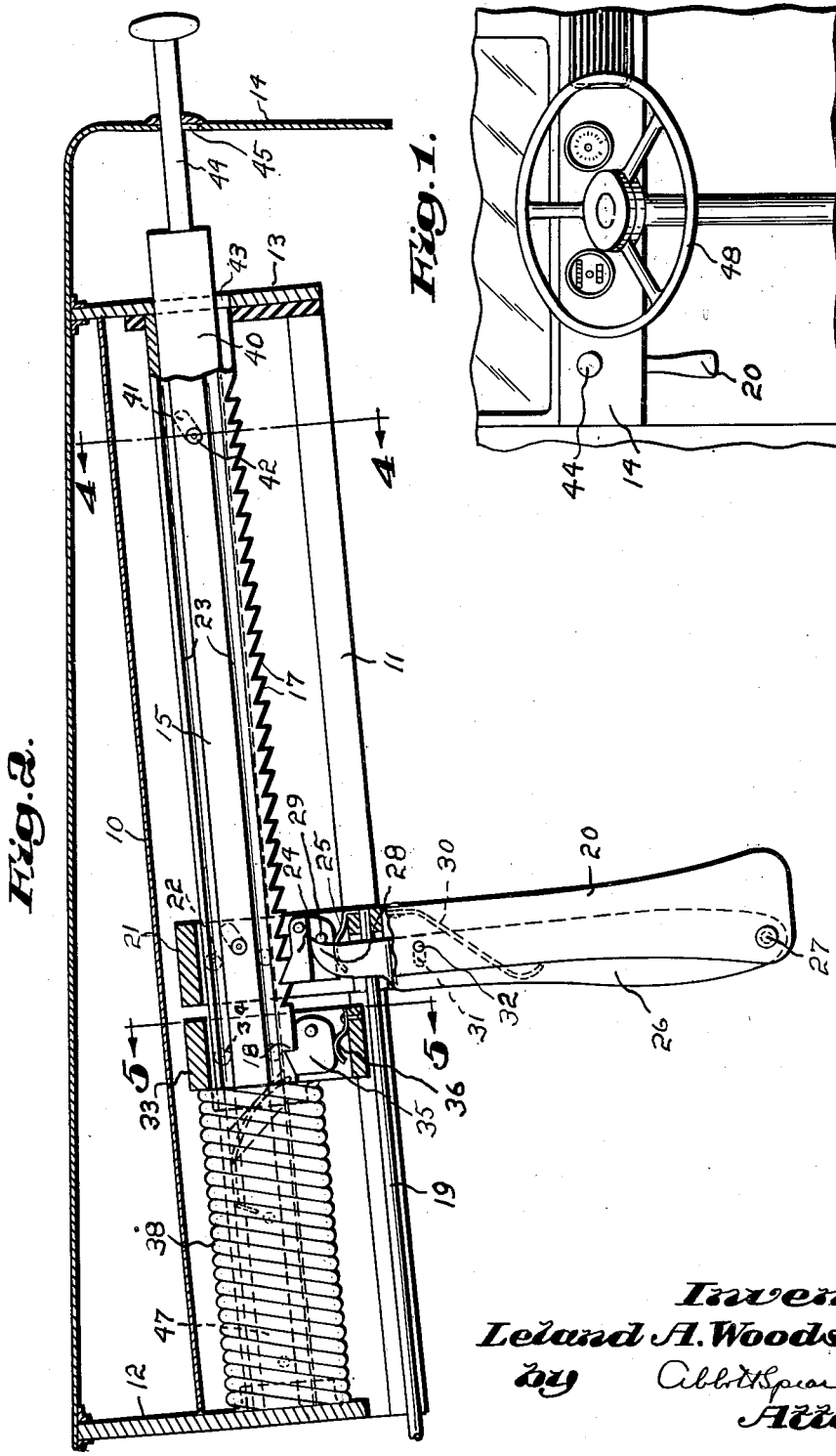

2,584,521

UNITED STATES PATENT OFFICE 2,584,521

EMERGENCY CONTROL FOR BRAKES

Leland A. Woodsworth, Roxbury, Mass.

Application June 7, 1951, Serial No. 230,388

9 Claims. (Cl. 74—503)

1

This invention relates to an emergency control for brakes and particularly to such a control for the emergency brakes of a motor vehicle.

Many accidents are caused by the fact that while the operator's reaction time remains constant, the distance a vehicle travels during that time varies with its speed as does the distance required to stop it once the brakes are engaged. The time required to actuate the foot operated brakes is appreciable, measured in terms of the vehicle's travel, so that the shortening of the time between the recognition of a danger and the full application of the brakes is of importance and means for so doing, through the full application of the emergency brake simply by actuating a release for a brake engaging source of power are the objectives of this invention.

The usual emergency brake of a motor vehicle has an operating member or handle conveniently accessible to the operator. That member has a pawl that resiliently locks with a rack to hold the handle against being moved in a brake disengaging direction unless the pawl is released from its locking position.

In accordance with the invention, the rack includes a movable unit urged by a spring to engage with and carry the operating member or handle in a brake engaging direction relative to the rack. The unit includes a pawl which locks with the rack when the spring is compressed. An operator control is employed to release that pawl so that the spring becomes instantly operative to effect full application of the emergency brakes. Such a control may be of any type and may simply require a short push to operate it and it may be located, on the instrument panel, for example, where only short movement of the operator's hand is required.

In the accompanying drawings, there is shown an embodiment of the invention which illustrates the features to which reference has been made and other novel features and advantages.

In the drawings:

Fig. 1 is a fragmentary view of a motor vehicle instrument panel showing the relationship of the emergency control to the operator, Fig. 2 is a longitudinal section through the emergency control in a position ready for instant use, Fig. 3 is a view, generally similar to Fig. 2, but showing the application of the brake by means of the emergency control, and Figs. 4 and 5 are views on planes indicated by lines 4—4 and 5—5, respectively, of Fig. 2.

In the illustrative embodiment of the inven-

2 tion shown in the drawings, there is shown a housing 10 having a downwardly opening guide slot 11 and suitably mounted as by walls 12 and 13 in back of the instrument panel 14. The walls 12 and 13 also support a substantially cylindrical rack 15 located within the housing 10 and having a chamber 16 in the form of a downwardly opening slot extending from end to end of the rack and vertically alined with the guide slot 11. The edges of the rack that are established by the slot 16 are provided with a series of rack teeth 17 and an oppositely disposed tooth 18.

The emergency brake includes an operating rod 19 and a handle 20 which in accordance with the invention is entrant of the guide slot 11 and includes a unit 21 in the form of a sleeve slidably supported by the rack 15 and having ball bearings 22 entrant of races 23 extending from end to end of the rack.

The unit 21 also houses a pivotable pawl 24 engageable with the rack teeth 17 under the influence of the spring 25 and locking therewith to hold the handle 20 against movement from a rearward brake engaging position forwardly into a brake releasing position. In order that the pawl 24 may be released, the handle 20 is chambered to receive the release arm 26 which is pivoted at 27 to the handle 20 and has its upper end formed as a hook 28 engageable with the pawl pin 29 thereby to draw the pawl 24 out of tooth engaging position when the release arm 26 is swung inwardly. The arm 26 is urged outwardly by a spring 30 and has a slot 31 through which extends a pin 32 extending transversely through the handle 20 to limit the extent to which it may swing in either direction. When the handle 20 is pulled rearwardly to apply the brakes, the pawl 24 is free to swing sufficiently to clear the teeth 17 without interference from the release arm hook 28 as is apparent from Figs. 2 and 3.

Forwardly of the unit 21, there is a second unit 33 which is also in the form of a sleeve supported by the rack 15 and provided with ball bearings 34 entrant of the rack races 23. The unit 33 also houses a pivotable pawl 35 yieldably urged into engagement with the tooth 18 by the spring 36 thereby to lock the unit 33 to the rack 15 against movement in a brake applying direction. The unit 33 has an annular projection 37 establishing a seat for one end of the coil spring 38 which surrounds the rack 15 and is backed by the wall 12, also provided with an annular spring seat 39.

The pawl 35 of the unit 33 engages the tooth 18 only when the spring 38 is compressed. Such compression of the spring 38 is effected by pushing the handle 20 in a brake releasing direction until the pawl 35 engages the tooth 18. The emergency brake may then be operated in a conventional manner.

In order to release the pawl 35 thereby to permit the spring 38 to function, the chamber of the rack 15 is provided with a control element 40 which has a pair of forwardly and downwardly inclined slots 41 through which extend supporting pins 42 extending transversely of and carried by the rack 15 to intersect its chamber. This control element 40 is thus supported for sliding movement relative to the stationary rack between the rearward raised position shown in Fig. 2 and the forward depressed position shown in Fig. 3. The control member 40 extends through slot 43 of the wall 13 and includes a handled stem 44 extending through the slot 45 of the instrument panel 14. The control member 40 is yieldably held in its rearward inoperative position by means of a spring 46 carried by the stop 47 anchored in the front part of the rack chamber 16. When the control member 40 is pushed forwardly from its position shown in Fig. 2, it is depressed, as shown in Fig. 3, thereby to swing the pawl 35 of the second unit 33 out of locking relation with the rack 15. This movement of the control element 40 also releases the pawl 24 of the unit 21.

The spring 38 is then free to carry the second unit 33 forwardly into engagement with the first unit 21 and to forcibly carry it and the brake handle 20 into a position in which the brakes are fully applied.

It will thus be appreciated that in accordance with the invention, the emergency brakes are fully applied instantly by pushing the control element 40 forwardly and with reference to Fig. 1, it will be noted that the control element 40 is so located adjacent the steering wheel 48 that it can be quickly and easily actuated by the operator when emergency conditions are encountered.

What I therefore claim and desire to secure by Letters Patent is:

1. An emergency control for an emergency brake of the type having a brake operating member movable between brake applying and brake releasing positions, a rack, and a unit connecting said member to said rack and including a pawl resiliently locking therewith against movement in a brake releasing direction, said control comprising a spring, a second unit movable by said spring relative to said rack in a brake applying direction to engage with said first unit and including a spring actuated pawl resiliently locking with said rack when said spring is compressed, and an operator control engageable with the pawl of said second unit to release it from said rack thereby to enable said spring to force said units in a brake applying direction.

2. An emergency control for an emergency brake of the type having a brake operating member movable between brake applying and brake releasing positions, a rack, and a pawl unit connecting said member to said rack and resiliently locking therewith against movement in a brake releasing direction, said control comprising a spring, a second unit movable by said spring relative to said rack in a brake applying direction to engage with said first named unit, said second unit including means locking it to said rack when said spring is under tension, and an operator control engageable with said means to release it from said rack thereby to enable said spring to force said units in a brake applying direction.

3. An emergency control for an emergency brake, said control comprising rack means, first and second units movable relative thereto and including spring actuated pawls, a brake operating member connected to said first unit and movable between brake engaging and brake releasing positions, the pawl of said first unit being operable to lock with said rack means against movement of said member towards a brake releasing position, a spring associated with said rack means, said second unit being engaged by said spring to be urged thereby to engage said first unit and to carry it in a brake applying direction but with the pawl of said second unit locking with said rack means when said spring is compressed, and an operator control engageable with the pawl of said second unit to unlock it from said rack whereby said spring then becomes operative to effect brake engagement.

4. An emergency control for an emergency brake, said control comprising a rack, first and second units slidably supported by said rack and including spring actuated pawls, a brake operating member connected to said first unit and movable between brake engaging and brake releasing positions, the pawl of said first unit being operable to lock with said rack against movement of said member towards a brake releasing position, a spring associated with said rack, said second unit being engaged by said spring to be urged thereby to engage said first unit and carry it in a brake applying direction but with the pawl of said second unit locking with said rack when said spring is compressed, and an operator control engageable with the pawl of said second unit to unlock it from said rack whereby said spring then becomes operative to effect brake engagement, said first unit engaging said second unit to compress said spring and to carry said second unit into locking position as said member is moved into brake releasing position.

5. An emergency control for an emergency brake, said control comprising a rack having a slot opening through one end and a side thereof, first and second units slidably supported by said rack and including spring actuated pawls located adjacent said slot, a brake operating member connected to said first unit and movable between brake engaging and brake releasing positions, the pawl of said first unit being operable to lock to said rack against movement of said member towards a brake releasing position, a spring surrounding said rack and engaging said second unit, said second unit being engaged by said spring to be urged thereby to engage with and carry said first unit in a brake applying direction but with its pawl locking to said rack when said spring is compressed, and an operator control slidable in said rack slot between operative and inoperative positions and supported by said rack out of engagement with said pawl of said second unit in said inoperative position but to engage therewith as said control is moved into its operative position thereby to release said second unit to enable said spring to effect brake engagement.

6. An emergency control for an emergency brake, said control comprising a rack having a slot opening through one end and a side thereof, said rack also having a plurality of races extending in a lengthwise direction, first and second units slidably supported by said rack and including ball bearings entrant of said races and spring operated pawls located adjacent said slot, a brake operating member connected to said first unit and movable between brake engaging and brake releasing positions, the pawl of said first unit being operable to lock to said rack against movement of said member towards a brake releasing position, a spring surrounding said rack and engaging said second unit, said second unit being engaged by said spring to be urged thereby to engage with and carry said first unit in a brake applying direction but with its pawl unit locking said rack when said spring is compressed, and an operator control slidable in said rack slot between operative and inoperative positions and supported by said rack out of engagement with said pawl of said second unit in said inoperative position but to engage therewith as said control is moved into its operative position thereby to release said second unit to enable said spring to effect brake engagement.

7. An emergency control for an emergency brake, said control comprising a rack having a chamber opening through one end and a side thereof, first and second units slidably supported by said rack and including spring actuated pawls located adjacent the side opening of said chamber, a brake operating member connected to said first unit and movable between brake engaging and brake releasing positions, the pawl of said first unit being operable to lock to said rack against movement of said member towards a brake releasing position, a spring surrounding said rack and engaging said second unit, said second pawl unit being engaged by said spring to be urged thereby to engage with and carry said first pawl unit in a brake applying direction but with its pawl locking to said rack when said spring is compressed, an operator control slidable in said chamber and extending from one end thereof for engagement by the operator, said operator control having a pair of forwardly and downwardly inclined slots, transverse pins carried by said rack and extending through said slots to enable said operator control to be slid from an inoperative raised position into an operative lowered position in which it engages the pawl of said second unit, and means yieldably holding said operator control in its inoperative position.

8. The emergency control of claim 7 in which the means yieldably holding the control in its inoperative position comprise a member anchored in the rack chamber, and a spring carried by the anchored member and engaging the control.

9. An emergency control for an emergency brake, said control comprising a housing having a guide slot, a rack in said housing having a chamber opening through one end and a side thereof in alinement with said guide slot, first and second units slidably supported by said rack and including spring actuated pawls located adjacent the side opening of said chamber, a brake operating member extending through said guide slot and movable between brake engaging and brake releasing positions, the pawl of said first unit being operable to lock to said rack against movement towards a brake releasing position, a spring in said housing operable to engage said second unit and carry said first unit with it in a brake applying direction but with the pawl of said second unit locking to said rack when said spring is under tension, and an operator control carried by said rack and extending exteriorly of said housing to release the pawl of said second unit.

LELAND A. WOODSWORTH.

REFERENCES CITED

The following references are of record in the file of this patent:

UNITED STATES PATENTS

| Number | Name | Date |
| --- | --- | --- |
| Re. 15,467 | Schauman | Oct. 10, 1922 |
| 1,679,181 | Schauman et al. | July 31, 1928 |
| 1,760,652 | Loomis | May 27, 1930 |

FOREIGN PATENTS

| Number | Country | Date |
| --- | --- | --- |
| 426,630 | Great Britain | Apr. 1, 1935 |